(12) United States Patent
Sasaki

(10) Patent No.: US 6,934,120 B2
(45) Date of Patent: *Aug. 23, 2005

(54) THIN-FILM MAGNETIC HEAD HAVING AUXILIARY LAYER DISPOSED UNDER PORTIONS OF TWO CONDUCTIVE LAYERS OF THIN-FILM COIL CONNECTED TO EACH OTHER

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/656,189

(22) Filed: Sep. 8, 2003

(65) Prior Publication Data

US 2005/0088781 A1     Apr. 28, 2005

Related U.S. Application Data

(62) Division of application No. 09/584,370, filed on May 31, 2000, now Pat. No. 6,643,095.

(30) Foreign Application Priority Data

Jun. 17, 1999   (JP)   ................................. 11-170512

(51) Int. Cl.$^7$ ............................................. G11B 5/147
(52) U.S. Cl. ..................................................... 360/126
(58) Field of Search ................................ 360/126, 317

(56) References Cited

U.S. PATENT DOCUMENTS

| 5,155,646 | A | 10/1992 | Fujisawa et al. | ............. 360/126 |
| 5,438,747 | A | 8/1995 | Krounbi et al. | .......... 29/603.16 |
| 5,473,491 | A | 12/1995 | Fujisawa et al. | ............. 360/126 |
| 6,154,346 | A | 11/2000 | Sasaki | ........................ 360/317 |
| 6,643,095 | B1 * | 11/2003 | Sasaki | ........................ 360/126 |

FOREIGN PATENT DOCUMENTS

| JP | A-60-10409 | 1/1985 |
| JP | A-62-245509 | 10/1987 |
| JP | A-7-262519 | 10/1995 |

* cited by examiner

*Primary Examiner*—David D. Davis
(74) *Attorney, Agent, or Firm*—Oliff & Berridge, PLC

(57) ABSTRACT

A recording head has a bottom pole layer and a top pole layer that include pole portions opposed to each other, a recording gap layer being placed between the pole portions. The recording head further has a thin-film coil. A raised portion is formed on a top surface of the recording gap layer in a region where a connecting portion of the thin-film coil is to be located. The coil is formed such that the connecting portion is formed on top of the raised portion. An insulating layer covers the coil and a top surface of the insulating layer is flattened. The connecting portion of the coil is only exposed from the top surface of the insulating layer. A conductive layer to be a lead is connected to the exposed connecting portion.

4 Claims, 11 Drawing Sheets

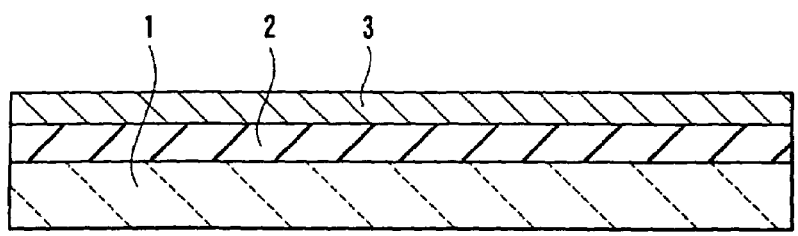 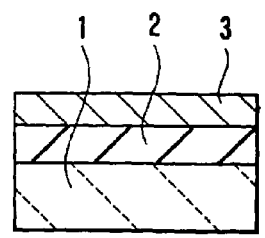
FIG. 1A                    FIG. 1B
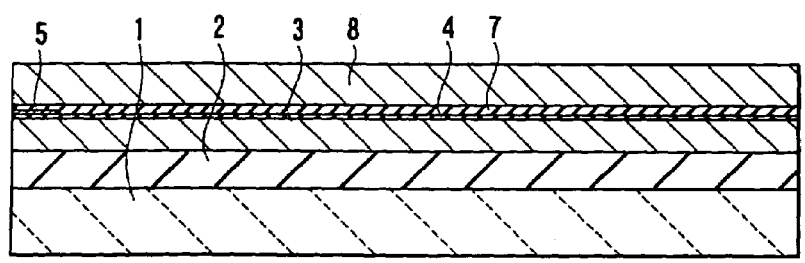 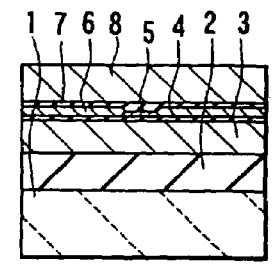
FIG. 2A                    FIG. 2B

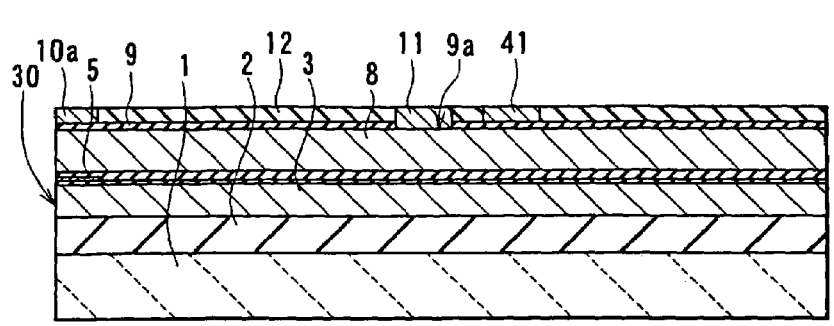 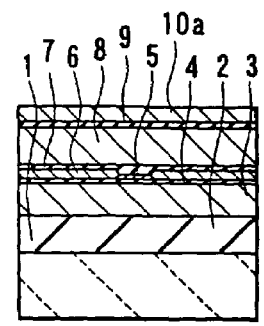
FIG. 3A    FIG. 3B
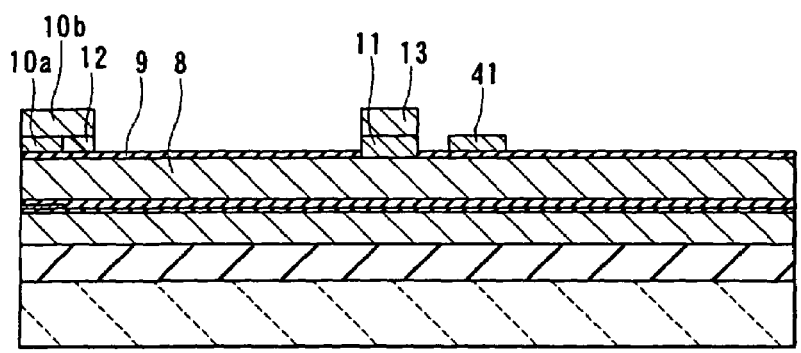 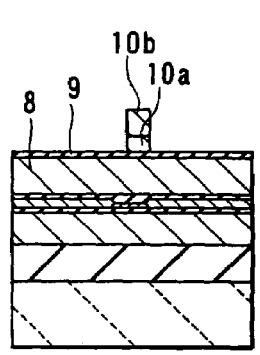
FIG. 4A    FIG. 4B

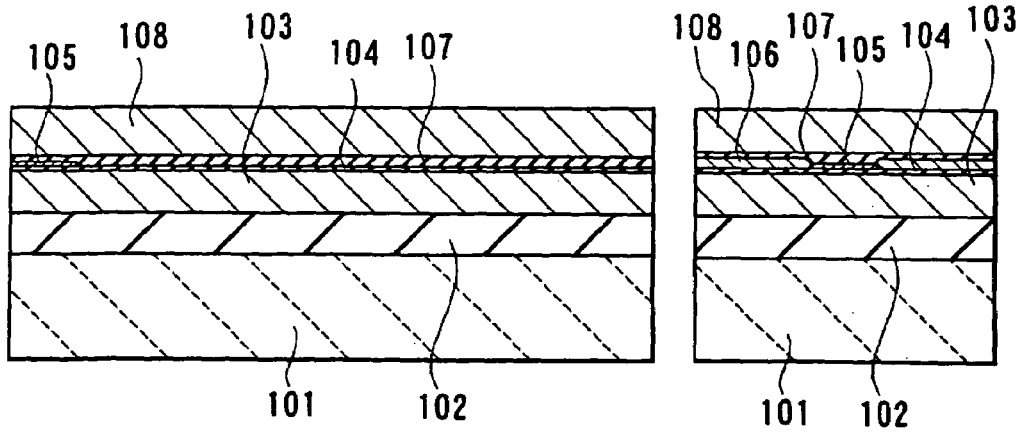
FIG. 13A
RELATED ART
FIG. 13B
RELATED ART
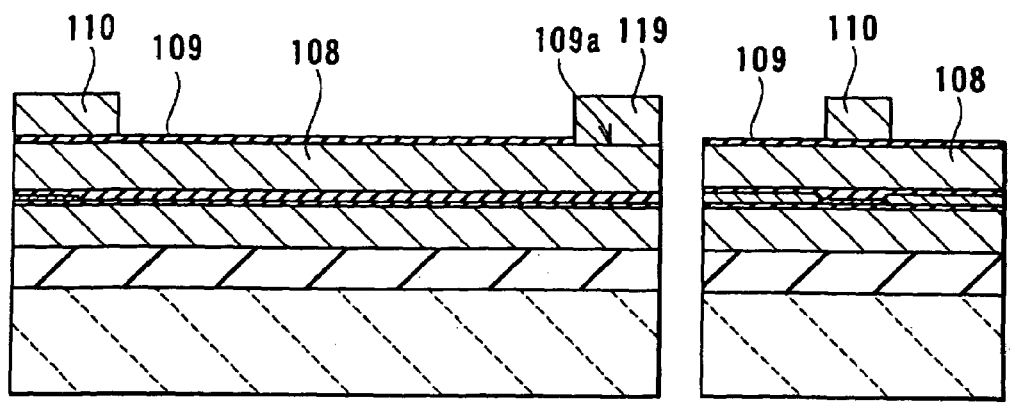
FIG. 14A
RELATED ART
FIG. 14B
RELATED ART

THIN-FILM MAGNETIC HEAD HAVING AUXILIARY LAYER DISPOSED UNDER PORTIONS OF TWO CONDUCTIVE LAYERS OF THIN-FILM COIL CONNECTED TO EACH OTHER

This is a Division of application Ser. No. 09/584,370 filed May 31, 2000 now U.S. Pat. No. 6,643,095. The entire disclosure of the prior application is hereby incorporated by reference herein in its entirety.

BACKGROUND OF THE INVENTION

1. Field of the Invention

The present invention relates to a thin-film magnetic head having at least an induction-type magnetic transducer and a method of manufacturing such a thin-film magnetic head, and to a thin-film coil element incorporated in a thin-film magnetic head and so on and a method of manufacturing such a thin-film coil element.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to microns or the order of submicron. Semiconductor process techniques are utilized to implement such a structure.

Reference is now made to FIG. 13A to FIG. 16A, FIG. 13B to FIG. 16B and FIG. 17 to describe an example of a method of manufacturing a composite thin-film magnetic head as an example of a related-art method of manufacturing a thin-film magnetic head. FIG. 13A to FIG. 16A are cross sections each orthogonal to an air bearing surface of the thin-film magnetic head. FIG. 13B to FIG. 16B are cross sections of a pole portion of the head each parallel to the air bearing surface.

In the manufacturing method, as shown in FIG. 13A and FIG. 13B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a bottom pole layer 108 that also functions as a top shield layer, having a thickness of about 3 $\mu$m, is formed. The bottom pole layer 108 is made of a magnetic material and is used for both a reproducing head and a recording head.

Next, as shown in FIG. 14A and FIG. 14B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 15A and FIG. 15B, the recording gap layer 109 and the bottom pole layer 108 are etched through ion milling, using the top pole tip 110 as a mask. As shown in FIG. 15B, the structure is called a trim structure wherein the sidewalls of the top pole (the top pole tip 110), the recording gap layer 109, and a part of the bottom pole layer 108 are formed vertically in a self-aligned manner.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 16A and FIG. 16B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the thin-film magnetic head including the recording head and the reproducing head. The thin-film magnetic head is thus completed.

FIG. 17 is a top view of the thin-film magnetic head shown in FIG. 16A and FIG. 16B. The overcoat layer 117 and the other insulating layers and insulating films are omitted in FIG. 17.

In FIG. 16A, 'TH' indicates the throat height and 'MR-H' indicates the MR height. The throat height is the length (height) of portions of magnetic pole layers facing each other with a recording gap layer in between, between the air-bearing-surface-side end and the other end. The MR height is the length (height) between the air-bearing-surface-side end of the MR element and the other end. In FIG. 16B, 'P2W' indicates the pole width, that is, the recording track width. In addition to the throat height, the MR height and so on, the apex angle as indicated with θ in FIG. 16A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 16A and FIG. 16B.

To achieve high surface recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer on the apex into small dimensions.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing related-art manufacturing steps illustrated in FIG. 14A to FIG. 16A and FIG. 14B to FIG. 16B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible that the top pole tip 110 that defines the track width is formed into small dimensions to some degree on the flat top surface of the recording gap layer 109.

However, the following problems are still found in the thin-film magnetic head having a structure as shown in FIG. 16A and FIG. 16B.

In the thin-film magnetic head shown in FIG. 16A and FIG. 16B, the recording track width is defined by the top pole tip 110. Therefore, it is not necessary that the top pole layer 116 is processed into dimensions as small as those of the top pole tip 110. However, if the recording track width is extremely reduced, that is, down to 0.5 μm or less, in particular, processing accuracy for achieving the submicron-order width is required for the top pole layer 116, too. However, the top pole layer 116 is formed on top of the apex in the head shown in FIG. 16A and FIG. 16B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by the thin-film magnetic head on a side of the top pole layer 116, too, and so-called 'side write' may result, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

Furthermore, it is difficult to reduce the magnetic path (yoke) length of a prior-art magnetic head. That is, if the coil pitch is reduced, a head with a reduced yoke length is achieved and a recording head having an excellent high frequency characteristic is achieved, in particular. However, if the coil pitch is reduced to the limit, the distance between the zero throat height position (the position of the air-bearing-surface-side end of the insulating layer that defines the throat height) and the outermost end of the coil is a major factor that prevents a reduction in yoke length. Since the yoke length of a two-layer coil can be shorter than that of a single-layer coil, a two-layer coil is adopted to many of recording heads for high frequency application. However, in the prior-art magnetic head, a photoresist film having a thickness of about 2 μm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 μm, the thickness of the insulating film between the layers of the coil is 2 μm, and the apex angle is 45 to 55 degrees, for example, the yoke length is required to be 6 to 8 μm which is twice as long as the distance between the outermost end of the coil and the neighborhood of the zero throat height position, that is, 3 to 4 μm (the distance between the innermost end of the coil and the portion where the top and bottom pole layers are in contact with each other is required to be 3 to 4 μm, too), in addition to the length of the portion corresponding to the coil. This length of the portion other than the portion corresponding to the coil is one of the factors that prevent a reduction in yoke length.

Assuming that a two-layer eleven-turn coil in which the line width is 1.2 μm and the space is 0.8 μm is fabricated, for example, the portion of the yoke length corresponding to the first layer 112 of the coil is 11.2 µm, if the first layer is made up of six turns and the second layer is made up of 5 turns, as shown in FIG. 16A and FIG. 16B. In addition to this length, the total of 6 to 8 µm, that is, the distance between each of the outermost and innermost ends of the first layer 112 of the coil and each of ends of the photoresist layer 113 for insulating the first layer 112, is required for the yoke length. Therefore, the yoke length is 17.2 to 19.2 µm. If an 11-turn coil is made up of one layer, the yoke length is 27.2 to 29.2 µm. In the present patent application, the yoke length is the length of a portion of the pole layer except the pole portion and the contact portions, as indicated with $L_0$ in FIG. 16A. As thus described, it is difficult in the prior art to further reduce the yoke length, which prevents improvements in high frequency characteristic.

In order to connect the first layer of the coil to the second layer of a prior-art head, a contact hole is made in an insulating layer covering the first-layer of the coil, the contact hole being provided in a region where the first layer is connected to the second layer. This is similar to the case where the coil is connected to a lead, that is, a contact hole is made in the insulating layer covering the coil in a region where the coil is connected to the lead. Therefore, additional steps are required for making the contact holes when the thin-film magnetic head is manufactured. Moreover, additional photomasks are required for making the contact holes.

OBJECTS AND SUMMARY OF THE INVENTION

It is a first object of the invention to provide a thin-film magnetic head and a method of manufacturing the same for achieving reductions in a track width and a yoke length of an induction-type magnetic transducer and for preventing an increase in the number of manufacturing steps.

It is a second object of the invention to provide a thin-film coil element and a method of manufacturing the same for achieving a reduction in size of the coil element and for preventing an increase in the number of manufacturing steps.

A thin-film magnetic head of the invention comprises a medium facing surface that faces toward a recording medium, and a first magnetic layer and a second magnetic layer that are magnetically coupled to each other and that include magnetic pole portions that are opposed to each other and placed in regions of the magnetic layers on a side of the medium facing surface. Each of the magnetic layers includes at least one layer. The thin-film magnetic head further comprises a gap layer provided between the pole portions of the first and second magnetic layers and a thin-film coil. At least a part of the thin-film coil is placed between the first and second magnetic layers, and is insulated from the first and second magnetic layers. The coil includes a first conductive layer having a connecting portion that is connected to a second conductive layer. The thin-film magnetic head further comprises an encasing portion formed between the first and second magnetic layers and having a bottom and a sidewall such that the first conductive layer is placed in the encasing portion. The thin-film magnetic head also comprises an auxiliary layer formed in a region of the bottom of the encasing portion where the connecting portion is located such that the auxiliary layer makes a distance between the bottom of the encasing portion and the connecting portion greater than a distance between the bottom of the encasing portion and the other part of the first conductive layer. Finally, the thin-film magnetic head comprises an insulating layer having a flattened surface located farther from the bottom of the encasing portion than the other surface of the insulating layer such that the connecting portion of the first conductive layer placed in the encasing portion is exposed from the flattened surface of the insulating layer and the other part of the first conductive layer is covered with the insulating layer.

A method of the invention is provided for manufacturing a thin-film magnetic head, the thin-film magnetic head comprising a medium facing surface that faces toward a recording medium, a first magnetic layer and a second magnetic layer, a gap layer, and a thin-film coil. The first and second magnetic layers are magnetically coupled to each other and that include magnetic pole portions that are opposed to each other and placed in regions of the magnetic layers on a side of the medium facing surface. Each magnetic layer includes at least one layer. The gap layer is provided between the pole portions of the first and second magnetic layers. At least a part of the thin-film coil is placed between the first and second magnetic layers and is insulated from the first and second magnetic layers. The coil includes a first conductive layer having a connecting portion that is connected to a second conductive layer. The method includes the steps of forming the first magnetic layer, forming the gap layer on the first magnetic layer and forming the second magnetic layer on the gap layer. The step for forming at least one of the magnetic layers includes forming of an encasing portion having a bottom and a sidewall such that the encasing portion is provided for encasing the first conductive layer. The method further includes the steps of forming an auxiliary layer in a region of the bottom of the encasing portion where the connecting portion is located such that the auxiliary layer makes a distance between the bottom of the encasing portion and the connecting portion greater than a distance between the bottom of the encasing portion and the other part of the first conductive layer. The method also includes forming the first conductive layer to be placed in the encasing portion forming an insulating layer to cover the first conductive layer placed in the encasing portion flattening a surface of the insulating layer located farther from the bottom of the encasing portion than the other surface of the insulating layer, such that the connecting portion of the first conductive layer placed in the encasing portion includes a portion exposed from the flattened surface of the insulating layer while the other part of the first conductive layer is covered with the insulating layer, and forming the second conductive layer to be connected to the portion of the connecting portion exposed from the flattened surface of the insulating layer.

According to the thin-film magnetic head or the method of manufacturing the same of the invention, the first conductive layer is placed in the encasing portion. In addition, the auxiliary layer makes the distance between the bottom of the encasing portion and the connecting portion greater than the distance between the bottom of the encasing portion and the other part of the first conductive layer. The connecting portion of the first conductive layer is exposed from the flattened surface of the insulating layer while the other part of the first conductive layer is covered with the insulating layer.

According to the thin-film magnetic head or the method of manufacturing the same of the invention, the second conductive layer may be a lead connected to the thin-film coil or may be a part of the thin-film coil.

According to the head of the invention, one of the magnetic layers may include: a pole portion layer forming one of the pole portions and including at least one layer; and a yoke portion layer forming a yoke portion. In addition, the auxiliary layer may be made of a material the same as a material of which the at least one layer of the pole portion layer is made.

According to the method of manufacturing the thin-film magnetic head of the invention, the step of forming one of the magnetic layers may include formation of: a pole portion layer forming one of the pole portions and including at least one layer; and a yoke portion layer forming a yoke portion. In addition, the step of forming the auxiliary layer may be performed at the same time as the at least one layer of the pole portion layer is formed.

A thin-film coil element of the invention comprises: a thin-film coil including a first conductive layer having a connecting portion connected to a second conductive layer; an encasing portion having a bottom and a sidewall, the first conductive layer being placed in the encasing portion; an auxiliary layer formed in a region of the bottom of the encasing portion where the connecting portion is located, the auxiliary layer making a distance between the bottom of the encasing portion and the connecting portion greater than a distance between the bottom of the encasing portion and the other part of the first conductive layer; and an insulating layer having a flattened surface located farther from the bottom of the encasing portion than the other surface of the insulating layer, the connecting portion of the first conductive layer placed in the encasing portion being exposed from the flattened surface of the insulating layer, the other part of the first conductive layer being covered with the insulating layer.

A method of the invention is provided for manufacturing a thin-film coil element comprising a thin-film coil including a first conductive layer, the first conductive layer having a connecting portion connected to a second conductive layer. The method includes the steps of: forming an encasing portion having a bottom and a sidewall, the encasing portion being provided for encasing the first conductive layer; forming an auxiliary layer in a region of the bottom of the encasing portion where the connecting portion is located, the auxiliary layer making a distance between the bottom of the encasing portion and the connecting portion greater than a distance between the bottom of the encasing portion and the other part of the first conductive layer; forming the first conductive layer to be placed in the encasing portion; forming an insulating layer to cover the first conductive layer placed in the encasing portion; flattening a surface of the insulating layer located farther from the bottom of the encasing portion than the other surface of the insulating layer, such that the connecting portion of the first conductive layer placed in the encasing portion includes a portion exposed from the flattened surface of the insulating layer while the other part of the first conductive layer is covered with the insulating layer; and forming the second conductive layer to be connected to the portion of the connecting portion exposed from the flattened surface of the insulating layer.

According to the thin-film coil element or the method of manufacturing the same of the invention, the first conductive layer is placed in the encasing portion. In addition, the auxiliary layer makes the distance between the bottom of the encasing portion and the connecting portion greater than the distance between the bottom of the encasing portion and the other part of the first conductive layer. The connecting portion of the first conductive layer is exposed from the flattened surface of the insulating layer while the other part of the first conductive layer is covered with the insulating layer.

According to the thin-film coil element or the method of manufacturing the same of the invention, the second conductive layer may be a lead connected to the thin-film coil or may be a part of the thin-film coil.

The thin-film coil element of the invention may further comprise an encasing portion forming layer provided for forming the encasing portion and including at least one layer. In addition, the auxiliary layer may be made of a material the same as a material of which the at least one layer of the encasing portion forming layer is made.

According to the method of manufacturing the thin-film coil element of the invention, the step of forming the encasing portion may include formation of an encasing portion forming layer for forming the encasing portion, the forming layer including at least one layer. In addition, the auxiliary layer may be formed at the same time as the at least one layer of the encasing portion forming layer is formed.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 13A and FIG. 13B are cross sections for illustrating a step in a method of manufacturing a thin-film magnetic head of related art.

FIG. 14A and FIG. 14B are cross sections for illustrating a step that follows FIG. 13A and FIG. 13B.

DETAILED DESCRIPTION OF THE PREFERRED EMBODIMENTS

Figures 5A, 5B:
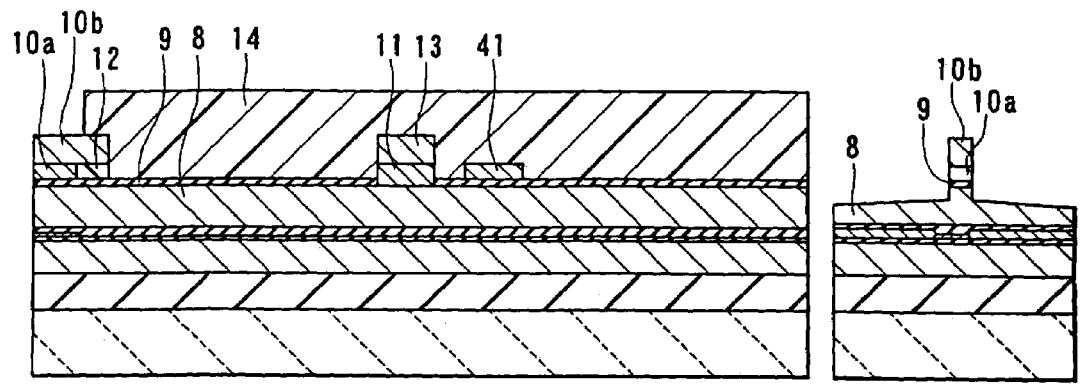
FIG. 5A and FIG. 5B are cross sections for illustrating a step that follows FIG. 4A and FIG. 4B.

Preferred embodiments of the invention will now be described in detail with reference to the accompanying drawings.

First Embodiment

Reference is now made to FIG. 1A to FIG. 8A, FIG. 1B to FIG. 8B, and FIG. 9 to describe a thin-film magnetic head and a method of manufacturing the same and a thin-film coil element and a method of manufacturing the same of a first embodiment of the invention. FIG. 1A to FIG. 8A are cross sections each orthogonal to an air bearing surface. FIG. 1B to FIG. 8B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 μm, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 μm is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 μm, for example, is formed over the entire surface. This insulating layer is polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD) using trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a bottom pole layer 8 that also functions as a top shield layer, having a thickness of about 2.5 to 3.5 μm, is selectively formed. The bottom pole layer 8 is made of a magnetic material and used for both a reproducing head and a recording head.

Next, as shown in FIG. 3A and FIG. 3B, a recording gap layer 9 made of an insulating material whose thickness is about 0.2 to 0.3 μm, for example, is formed on the bottom pole layer 8 and the top shield gap film 7. In general, the insulating material used for the recording gap layer 9 may be alumina, aluminum nitride, a silicon-dioxide-base material, a silicon-nitride-base material, or diamond-like carbon (DLC) and so on.

Next, a portion of the recording gap layer 9 in a region corresponding to a center portion of a thin-film coil described later is etched to form a contact hole 9a for making the magnetic path.

Next, a first pole portion layer 10a having a thickness of about 0.5 to 1.0 μm, for example, is formed on a portion of the recording gap layer 9 in a neighborhood of an end of the recording gap layer 9 on a side of the air bearing surface 30. The first pole portion layer 10a is made of a magnetic material and forms a part of the pole portion of the top pole layer. At the same time, a magnetic layer 11 made of a magnetic material and having a thickness of about 0.5 to 1.0 μm, for example, is formed for making the magnetic path in the contact hole 9a for making the magnetic path. At this point in the manufacturing process, the width of the first pole portion layer 10a (that is, the dimension in the horizontal direction in FIG. 3B) is greater than the recording track width. The length of a portion of the first pole portion layer 10a to be the part of the pole portion (that is, the dimension in the horizontal direction in FIG. 3A) is equal to the throat height.

In this embodiment, a top surface of the recording gap layer 9 around the magnetic layer 11 will be a bottom of a portion for encasing the thin-film coil described later. In the embodiment a raised portion 41 having a thickness of about 0.5 to 1.0 μm, for example, is formed in a region on the recording gap layer 9 where a connecting portion described later of the coil is to be located. The raised portion 41 is provided as an auxiliary layer for making the distance between the bottom of the encasing portion and the connecting portion greater than the distance between the bottom of the encasing portion and the other part of the coil. Although a material of the portion 41 is not particularly specified, it is preferred that the first pole portion layer 10a and the magnetic layer 11 of the top pole layer and the portion 41 are made of the same magnetic material, and the portion 41 is formed at the same time as the first pole portion layer 10a and the magnetic layer 11 are formed.

Next, an insulating layer 12 made of alumina, for example, having a thickness of about 1.0 to 2.0 μm, for example, is formed over the entire surface. The insulating layer 12 is then polished through CMP, for example, until the first pole portion layer 10a, the magnetic layer 11, and the raised portion 41 are exposed, and the surface is flattened. In FIG. 3A the zero throat height position is the position of the interface between the first pole portion layer 10a and the insulating layer 12.

Next, as shown in FIG. 4A and FIG. 4B, a second pole portion layer 10b having a thickness of about 2.5 to 3.5 μm, for example, is formed on the first pole portion layer 10a. The second pole portion layer 10b is made of a magnetic material and includes a portion to be the other part of the pole portion of the top pole layer. At the same time, a magnetic layer 13 having a thickness of about 2.5 to 3.5 μm, for example, is formed on the magnetic layer 11. The width of a portion of the second pole portion layer 10b touching the first pole portion layer 10a is equal to the recording track width. The entire length of the second pole portion layer 10b is greater than the length of the portion of the first pole portion layer 10a to be the part of the pole portion.

The first pole portion layer 10a and the second pole portion layer 10b may be made of NiFe (80 weight % Ni and 20 weight % Fe), or NiFe (45 weight % Ni and 55 weight % Fe) as a high saturation flux density material and formed into specific shapes through plating or may be made of a material such as FeN or FeZrN as a high saturation flux density material through sputtering and selectively etched through ion milling, for example, into the specific shapes. Alternatively, a material such as CoFe or a Co-base amorphous material as a high saturation flux density material may be used.

Next, the first pole portion layer 10a and the insulating layer 12 are etched through ion milling using an argon-base gas, for example, with the second pole portion layer 10b as a mask. As a result, the width of the portion of the first pole portion layer 10a touching the second pole portion layer 10b is made equal to the width of the second pole portion layer 10b, that is, the recording track width.

In this embodiment the region around the magnetic layers 11 and 13 is the encasing portion in which the thin-film coil is placed. The bottom of the encasing portion is the top surface of the recording gap layer 9. Sidewalls of the encasing portion are made up of the sidewalls of the magnetic layers 11 and 13 and the sidewalls of the insulating layer 12 and the second pole portion layer 10b.

Next, as shown in FIG. 5A and FIG. 5B, a photomask 14 for trimming is formed on a portion other than the region where etching is required for making the trim structure. The recording gap layer 9 is then selectively etched through dry etching, using the first pole portion layer 10a and the second pole portion layer 10b and the photomask 14 as masks. The dry etching may be RIE using a chlorine-base gas such as $BCl_2$ or $Cl_2$, or a fluorine-base gas such as $CF_4$ or $SF_6$, for example. Next, the bottom pole layer 8 is selectively etched by about 0.3 to 0.6 μm through ion milling using an argon-base gas, for example. The trim structure as shown in FIG. 5B is thus formed. The trim structure suppresses an increase in the effective track width due to expansion of a magnetic flux generated during writing in a narrow track. The photomask 14 is then removed.

Figures 6A, 6B:
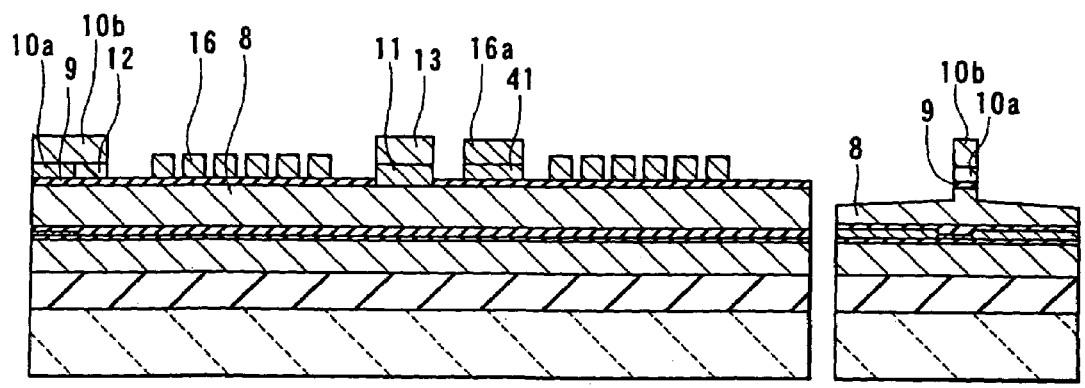
FIG. 6A and FIG. 6B are cross sections for illustrating a step that follows FIG. 5A and FIG. 5B.

Next, as shown in FIG. 6A and FIG. 6B, the thin-film coil 16 made of copper, for example, is formed by a method such as frame plating on the recording gap layer 9 that is the bottom of the encasing portion. For example, the thickness of the coil 16 is about 1.0 to 2.0 μm and the pitch is 1.2 to 2.0 μm. The coil 16 is wound around the magnetic layers 11 and 13 and a part of the coil 16 is located on a side of the first pole portion layer 10a. In this embodiment the connecting portion 16a is formed on the raised portion 41. The portion 16a is provided for connecting the coil 16 to a conductive layer to be a lead described later.

Figures 7A, 7B:
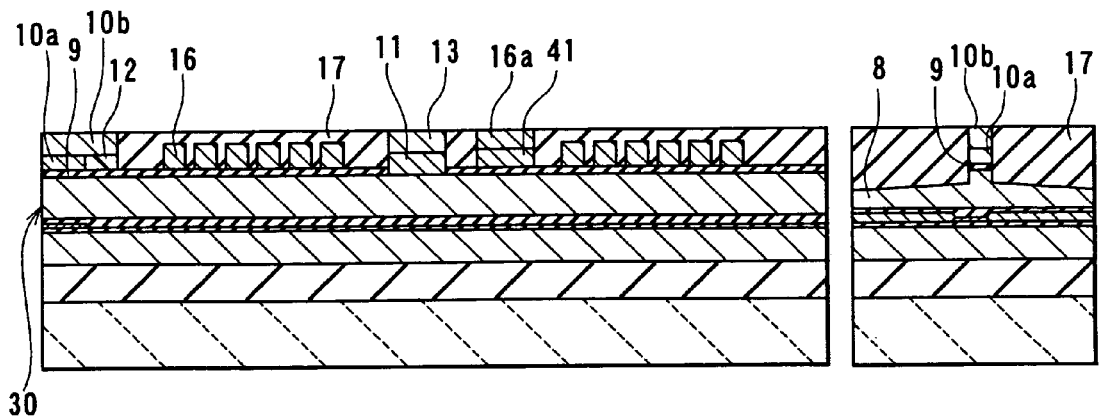
FIG. 7A and FIG. 7B are cross sections for illustrating a step that follows FIG. 6A and FIG. 6B.

Next, as shown in FIG. 7A and FIG. 7B, an insulating layer 17 of alumina, for example, having a thickness of about 3 to 4 g m is formed over the entire surface. The insulating layer 17 is then polished through CMP, for example, so that the second pole portion layer 10b, the magnetic layer 13 and the connecting portion 16a are exposed, and the surface is flattened. After this flattening is performed, the connecting portion 16a of the coil 16 placed in the encasing portion is exposed from the top surface of the insulating layer 17 while the other part of the coil 16 is covered with the insulating layer 17.

Figures 8A, 8B:
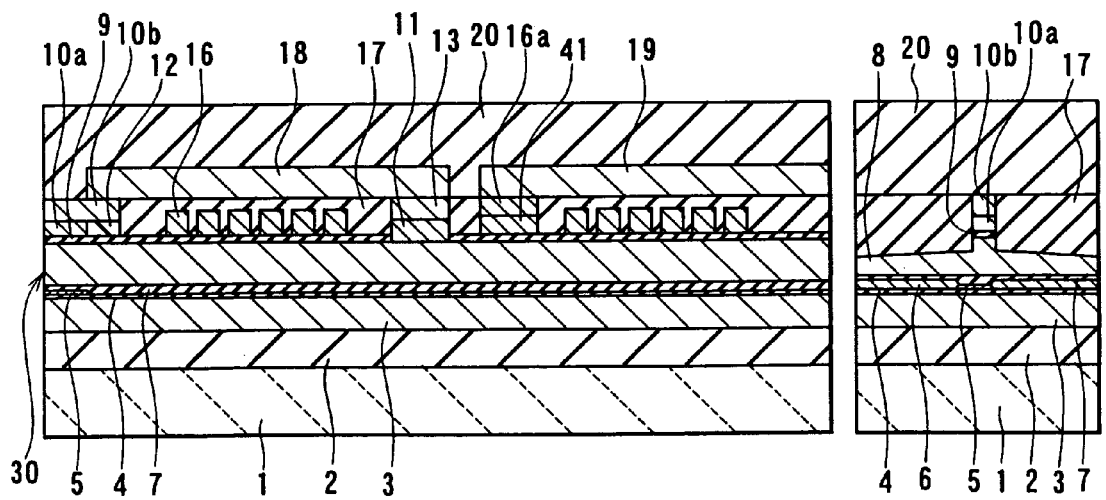
FIG. 8A and FIG. 8B are cross sections of the thin-film magnetic head of the first embodiment.

Next, as shown in FIG. 8A and FIG. 8B, a yoke portion layer 18 having a thickness of about 2.0 to 3.0 μm, for example, is formed to be a yoke portion of the top pole layer on the second pole portion layer 10b, the insulating layer 17 and the magnetic layer 13. At the same time, the conductive layer 19 having a thickness of about 2.0 to 3.0 μm, for example, is formed. The conductive layer 19 is to be the lead connected to the portion 16a. The yoke portion layer 18 may be made of NiFe (80 weight % Ni and 20 weight % Fe), or NiFe (45 weight % Ni and 55 weight % Fe) as a high saturation flux density material and formed into a specific shape through plating or may be made of a material such as FeN or FeZrN as a high saturation flux density material through sputtering and then selectively etched through ion milling, for example, into the specific shape. Alternatively, a material such as CoFe or a Co-base amorphous material as a high saturation flux density material may be used. To improve the high frequency characteristic, the yoke portion layer 18 may be made of a number of layers of inorganic insulating films and magnetic layers of Permalloy, for example.

An end face of the yoke portion layer 18 facing toward the air bearing surface 30 is located at a distance of only 0.5 to 1.0 μm, for example, from the air bearing surface 30. In this embodiment, in particular, the end face of the yoke portion layer 18 is located near the zero throat height position.

Next, an overcoat layer 20 of alumina, for example, having a thickness of 20 to 40 μm, for example, is formed over the entire surface. The surface of the overcoat layer 20 is then flattened and pads (not shown) for electrodes are formed on the overcoat layer 20. Finally, lapping of the slider is performed to form the air bearing surfaces 30 of the thin-film magnetic head including the recording head and the reproducing head. The thin-film magnetic head of the embodiment is thus completed.

Figure 9:
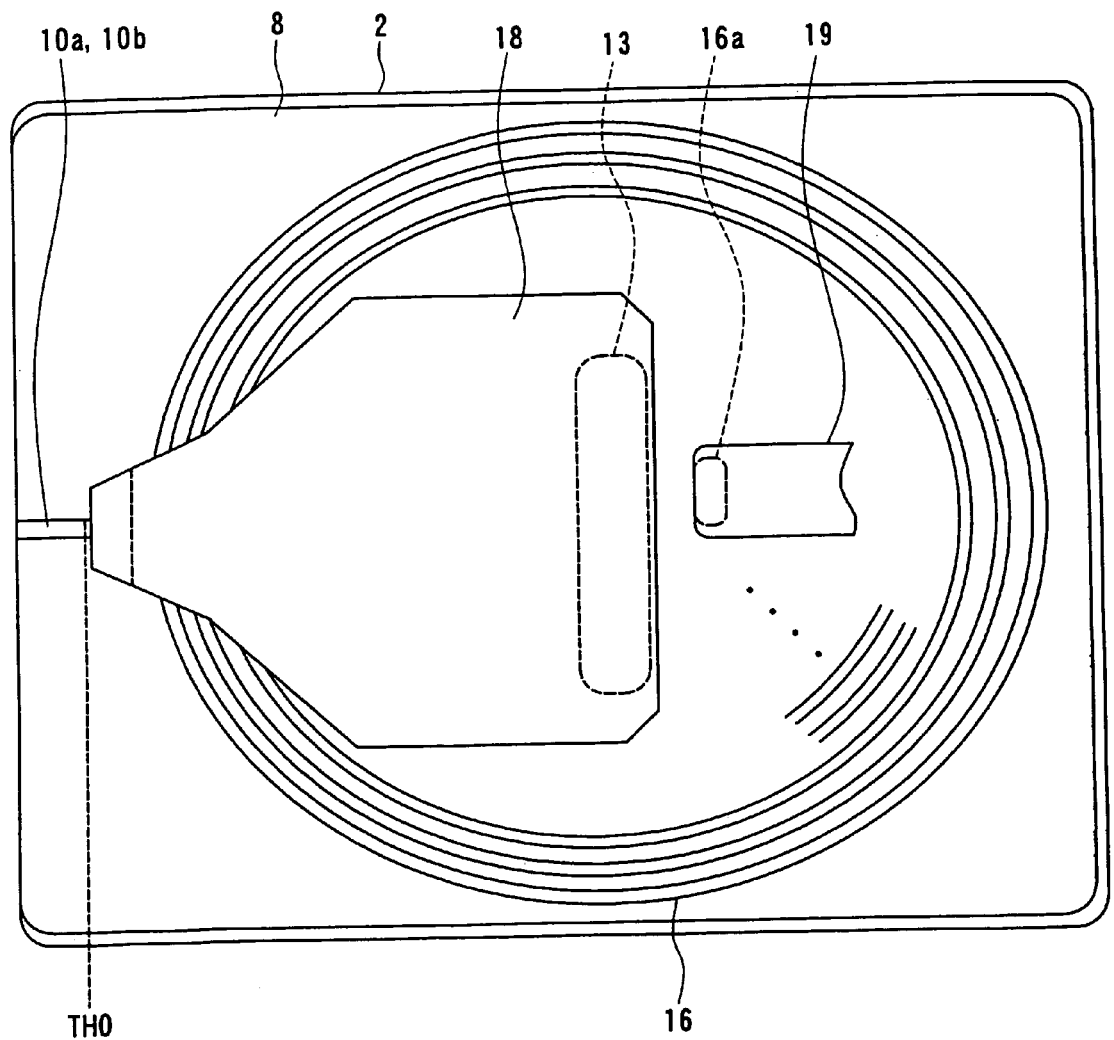
FIG. 9 is a top view of the thin-film magnetic head of the first embodiment.

FIG. 9 is a top view of the thin-film magnetic head of the embodiment, wherein the overcoat layer 20 and the other insulating layers and insulating films are omitted. In FIG. 9 'THO' indicates the zero throat height position.

In this embodiment the bottom pole layer 8 corresponds to a first magnetic layer of the invention. The top pole layer made up of the first pole portion layer 10a, the second pole portion layer 10b, the magnetic layers 11 and 13 and the yoke portion layer 18 corresponds to a second magnetic layer of the invention. The bottom shield layer 3 corresponds to a first shield layer of the invention. Since the bottom pole layer 8 also functions as the top shield layer, the bottom pole layer 8 corresponds to a second shield layer of the invention, too.

Since the thin-film coil 16 is made up of a single layer in this embodiment, the coil 16 itself corresponds to a first conductive layer of the invention. The conductive layer 19 to be the lead corresponds to a second conductive layer of the invention. The pole portion layers 10a and 10b, the insulating layer 12 and the magnetic layers 11 and 13 that make up the portion encasing the coil 16 correspond to an encasing portion forming layer of the invention. The coil 16, the above-mentioned layers making up the encasing portion, the raised portion 41, the insulating layer 17 and the conductive layer 19 make up the thin-film coil element of the embodiment.

As described so far, the thin-film magnetic head of the embodiment comprises the reproducing head and the recording head (the induction-type magnetic transducer). The reproducing head has: the MR element 5; and the bottom shield layer 3 and the top shield layer (bottom pole layer 8) for shielding the MR element 5. Portions of the bottom shield layer 3 and the top shield layer on a side of the medium facing surface (the air bearing surface 30) facing toward a recording medium are opposed to each other, the MR element 5 being placed between the portions.

The recording head has the bottom pole layer 8 and the top pole layer (including the first pole portion layer 10a, the second pole portion layer 10b, the magnetic layers 11 and 13 and the yoke portion layer 18) magnetically coupled to each other, each of which includes at least one layer. The bottom pole layer 8 and the top pole layer include pole portions opposed to each other and placed in regions facing toward a recording medium. The recording head further has: the recording gap layer 9 placed between the pole portion of the bottom pole layer 8 and the pole portion of the top pole layer; and the thin-film coil 16 at least a part of which is placed between the two pole layers, the at least part of the coil being insulated from the two pole layers.

In this embodiment the first pole portion layer 10a of the top pole layer is formed on the flat recording gap layer 9. The second pole portion layer 10b of the top pole layer is formed on the flat first pole portion layer 10a and insulating layer 12, too. In the embodiment the portion for encasing the thin-film coil 16 is made up of the pole portion layers 10a and 10b, the insulating layer 12 and the magnetic layers 11 and 13. The coil 16 is placed in this encasing portion. Furthermore, the insulating layer 17 covering the coil 16 is formed and the top surface of the insulating layer 17 is flattened. The yoke portion layer 18 of the top pole layer is formed on the flattened insulating layer 17.

As thus described, according to the embodiment, each of the pole portion layers 10a and 10b and the yoke portion layer 18 of the top pole layer is formed to have small dimensions with accuracy on the flat surface. It is therefore possible to reduce the recording track width.

In the embodiment the thin-film coil 16 is formed on the flat recording gap layer 9. It is thereby possible to form the thin-film coil 16 of small dimensions with accuracy. Furthermore, according to the embodiment, it is possible that an end of the coil 16 is placed near zero throat height position TH0, that is, near the interface between the first pole portion layer 10a and the insulating layer 12, since no apex exists.

As thus described, according to the embodiment, the yoke length is reduced by about 30 to 40 percent of that of a prior-art head, for example. Furthermore, a magnetomotive force generated by the thin-film coil 16 is prevented from saturating halfway. It is thereby possible to utilize the magnetomotive force with efficiency. It is therefore possible to provide a thin-film magnetic head having a recording head with an excellent high frequency characteristic, an excellent nonlinear transition shift (NLTS) characteristic and an excellent overwrite property that is a parameter indicating one of characteristics when data is written over existing data.

According to the embodiment, a reduction in yoke length is achieved. As a result, it is possible to greatly reduce the entire length of the thin-film coil 16 without changing the number of turns of the coil. The resistance of the coil 16 is thereby reduced. It is therefore possible to reduce the thickness of the coil 16.

According to the embodiment, the insulating layer 17 is provided to cover the thin-film coil 16 placed in the encasing portion, and the top surface of the insulating layer 17 is flattened. As a result, it is impossible that the insulating layer covering the coil 16 extends over a wide area as in the case where a photoresist layer covers the coil 16. It is therefore possible to reduce the thin-film coil element in size.

In the embodiment the raised portion 41 as the auxiliary layer is formed on the top surface of the recording gap layer 9 that is the bottom of the encasing portion and in a region where the connecting portion 16a of the coil 16 is located. Furthermore, the coil 16 is formed in the encasing portion such that the connecting portion 16a is formed on top of the raised portion 41. The insulating layer 17 is then formed to cover the coil 16 and the top surface of the insulating layer 17 is flattened. The connecting portion 16a of the coil 16 is only exposed from the top surface of the insulating layer 17. The conductive layer 19 is connected to the exposed connecting portion 16a.

As a result, according to the embodiment, no manufacturing step is required for making a contact hole in a portion of the insulating layer 17 on top of the connecting portion 16a of the coil 16 so as to connect the portion 16a to the conductive layer 19. No photomask is required, either, for making the contact hole. In addition, if the raised portion 41 is formed at the same time as the first pole portion layer 10a and the magnetic layer 11 of the top pole layer, no extra step is required for making the raised portion 41, and no extra photomask is required, either. Therefore, the embodiment prevents an increase in the number of steps for manufacturing the thin-film magnetic head.

In the embodiment the top pole layer has: the first pole portion layer 10a, the second pole portion layer 10b, and the yoke portion layer 18. The first pole portion layer 10a forms a part of the pole portion and has a width equal to the recording track width and a length equal to the throat height. One of the surfaces of the first pole portion layer 10a is adjacent to the recording gap layer 9. The second pole portion layer 10b includes the other part of the pole portion. One of the surfaces of the second pole portion layer 10b touches the other surface of the first pole portion layer 10a. The width of a portion of the second pole portion layer 10b touching the first pole portion layer 10a is equal to the width of the first pole portion layer 10a, that is, the recording track width. The entire length of the second pole portion layer 10b is greater than the length of the first pole portion layer 10a. The yoke portion layer 18 is connected to the other surface of the second pole portion layer 10b and forms the yoke portion. Therefore, according to the embodiment, the throat height is defined by the first pole portion layer 10a of the top pole layer. The recording track width is defined by the first pole portion layer 10a and the second pole portion layer 10b of the top pole layer.

In this embodiment the first pole portion layer 10a finally has a length equal to the throat height and a width equal to the recording track width. However, the first pole portion layer 10a is first formed to have a width greater than the recording track width. The second pole portion layer 10b having a width equal to the recording track width is then formed, which is followed by etching of the first pole portion layer 10a with the second pole portion layer 10b as a mask. The width of the first pole portion layer 10a is thereby made equal to the recording track width. As thus described, according to the embodiment, the first pole portion layer 10a is first formed to have a width greater than the recording track width. As a result, the first pole portion layer 10a is formed with more accuracy without pattern edges being rounded, compared to the case where the pole portion originally has a width equal to the recording track width and a length equal to the throat height. Furthermore, according to the embodiment, the first pole portion layer 10a is formed on the flat surface. The first pole portion layer 10a is thus formed with further accuracy in this respect, too. Therefore, according to the embodiment, the throat height is defined with accuracy even when the track width is reduced.

According to the embodiment, the second pole portion layer 10b is formed such that: the width of the portion of the second pole portion layer 10b touching the first pole portion layer 10a is equal to the recording track width; and the entire length of the second pole portion layer 10b is greater than the length of the first pole portion layer 10a. Therefore, the second pole portion layer 10b is formed with more accuracy, compared to the case where the pole portion has a width equal to the recording track width and a length equal to the throat height. Furthermore, according to the embodiment, the second pole portion layer 10b is formed on the first pole portion layer 10a and the insulating layer 12 whose top surfaces are flattened. The second pole portion layer 10b is thus formed with further accuracy in this respect, too. Therefore, according to the embodiment, the track width is defined with accuracy even when the track width is reduced.

If a yoke portion layer is connected to a pole portion having a width equal to the recording track width and a length equal to the throat height, the cross-sectional area of the magnetic path abruptly decreases in the portion connecting the yoke portion layer to the pole portion. As a result, a magnetic flux is saturated in this portion. According to the embodiment, in contrast, the first pole portion layer 10a is connected to the yoke portion layer 18 through the second pole portion layer 10b. In addition, relatively wide areas of the second pole portion layer 10b and the yoke portion layer 18 are in contact with each other since the second pole portion layer 10b is greater than the first pole portion layer 10a in length. Therefore, according to the embodiment, it is impossible that the cross-sectional area of the magnetic path abruptly decreases in the portion connecting the yoke portion layer 18 to the first pole portion layer 10a. As a result, saturation of a magnetic flux halfway through the magnetic path is prevented. According to the embodiment, it is thereby possible to utilize the magnetomotive force generated by the thin-film coil 16 for writing with efficiency.

In this embodiment the end face of the yoke portion layer 18 facing toward the air bearing surface 30 is located at a distance from the air bearing surface 30. As a result, the embodiment prevents 'side write', that is, writing of data in a region of a recording medium where data is not supposed to be written. In the embodiment the first pole portion layer 10a is connected to the yoke portion layer 18 through the second pole portion layer 10b whose entire length is greater than the throat height. Therefore, it is impossible that the cross-sectional area of the magnetic path abruptly decreases even though the end face of the yoke portion layer 18 facing toward the air bearing surface 30 is located at a distance from the air bearing surface 30 as described above.

According to the embodiment, the recording gap layer 9 is provided between the bottom pole layer 8 and the thin-film coil 16. The gap layer 9 is a thin insulating film made of an inorganic material that achieves sufficient insulation strength. High insulation strength is thereby obtained between the bottom pole layer 8 and the coil 16.

In the embodiment the thin-film coil 16 is covered with the insulating layer 17 made of an inorganic insulation material. It is thereby possible to prevent the pole portion from protruding toward a recording medium due to expansion resulting from heat generated around the coil 16 when the thin-film magnetic head is used.

Second Embodiment

Figures 10A, 10B:
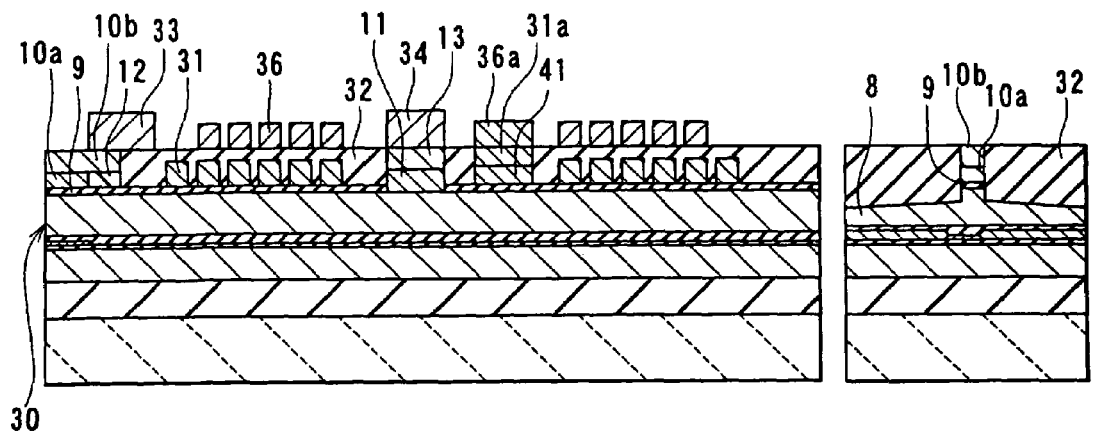
FIG. 10A and FIG. 10B are cross sections for illustrating a step in a method of manufacturing a thin-film magnetic head of a second embodiment of the invention.
Figures 11A, 11B:
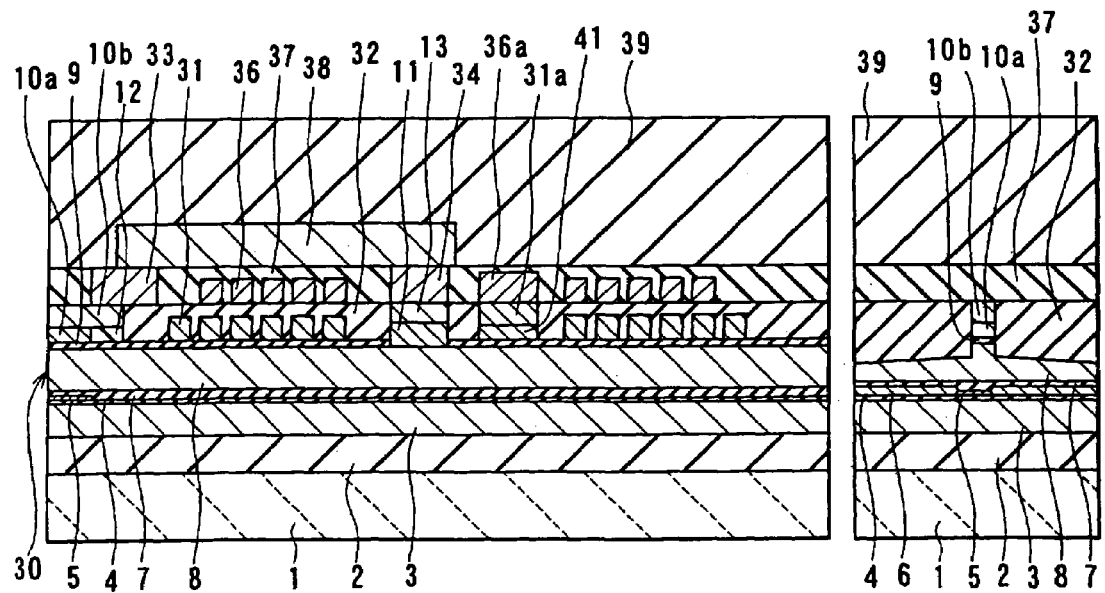
FIG. 11A and FIG. 11B are cross sections of the thin-film magnetic head of the second embodiment.

Reference is now made to FIG. 10A, FIG. 10B, FIG. 11A, FIG. 11B, and FIG. 12 to describe a thin-film magnetic head and a method of manufacturing the same of a second embodiment of the invention. FIG. 10A and FIG. 11A are cross sections orthogonal to an air bearing surface. FIG. 10B and FIG. 11B are cross sections of a pole portion parallel to the air bearing surface.

A two-layer thin-film coil is provided in the thin-film magnetic head of the second embodiment. The head includes a first layer 31 of the coil in place of the thin-film coil 16 of the first embodiment, and an insulating layer 32 in place of the insulating layer 17 of the first embodiment. The first layer 31 has a portion 31a for connecting the first layer 31 to a second layer of the coil described later.

The steps of the method of manufacturing the thin-film magnetic head of the second embodiment that are taken until the insulating layer 32 is flattened are similar to those of the first embodiment that are taken until the insulating layer 17 is flattened. In the second embodiment, the connecting portion 31a of the first layer 31 of the coil is formed on the raised portion 41. After the insulating layer is flattened, the portion 31a of the first layer 31 of the coil is exposed from the top surface of the insulating layer 32 while the other part of the first layer 32 is covered with the insulating layer 32.

In the following step of the method of the second embodiment, as shown in FIG. 10A, a connecting layer 33 made of a magnetic material and having a thickness of about 2.0 to 3.0 µm, for example, is formed on the second pole portion layer 10b and the insulating layer 32. The connecting layer 33 is provided for connecting the second pole portion layer 10b to a yoke portion layer described later. At the same time, a magnetic layer 34 having a thickness of about 2.0 to 3.0 µm, for example, is formed on the magnetic layer 13.

An end face of the connecting layer 33 on a side of the air bearing surface 30 is located at a distance of 0.5 to 1.0 µm only, for example, from the air bearing surface 30. In this embodiment, in particular, the end face of the connecting layer 33 is located near the zero throat height position. The connecting layer 33 is about 3.0 µm in length, for example. As the distance increases between the air bearing surface 30 and an end face of the connecting layer 33 opposite to the air bearing surface 30, the distance increases between the air bearing surface 30 and an end face of the yoke portion layer described later that faces toward the air bearing surface 30. However, the yoke length thereby increases. Therefore, it is preferred that the end face of the connecting layer 33 opposite to the air bearing surface 30 is located at a distance from an end face of the second pole portion layer 10b opposite to the air bearing surface 30, toward the side opposite to the air bearing surface 30. The distance is nearly equal to the thickness of the connecting layer 33.

The connecting layer 33 may be made of NiFe (80 weight % Ni and 20 weight % Fe), or NiFe (45 weight % Ni and 55 weight % Fe) as a high saturation flux density material and formed into a specific shape through plating or may be made of a material such as FeN or FeZrN as a high saturation flux density material through sputtering and then selectively etched through ion milling, for example, into the specific shape. Alternatively, a material such as CoFe or a Co-base amorphous material as a high saturation flux density material may be used.

Next, the second layer 36 of the thin-film coil made of copper, for example, is formed by a method such as frame plating on the insulating layer 32. For example, the thickness of the second layer 36 is about 1.0 to 2.0 µm and the coil pitch is 1.2 to 2.0 µm. The second layer 36 is wound around the magnetic layer 34 and a part of the layer 36 is located on a side of the connecting layer 33. A portion 36a of the second layer 36 is formed on top of the connecting portion 31a of the first layer 31 exposed from the insulating layer 32.

Next, as shown in FIG. 11A and FIG. 11B, an insulating layer 37 of alumina, for example, having a thickness of about 3 to 4 µm is formed over the entire surface. The insulating layer 37 is then polished through CMP, for example, so that the connecting layer 33 and the magnetic layer 34 are exposed, and the surface is flattened. Although the second layer 36 is not exposed in FIG. 11A, the second layer 36 may be exposed. If the second layer 36 is exposed, an insulating film is formed to cover the second layer 36.

Next, the yoke portion layer 38 having a thickness of about 2.0 to 3.0 µm, for example, is formed to be a yoke portion of the top pole layer on the connecting layer 33, the insulating layer 37 and the magnetic layer 34. The material and method of making the yoke portion layer 38 are similar to those of the yoke portion layer 18 of the first embodiment.

An end face of the yoke portion layer 38 on a side of the air bearing surface 30 is located at a distance from the air bearing surface 30. In this embodiment, in particular, the end face of the yoke portion layer 38 is located farther from the air bearing surface 30 than the zero throat height position.

Next, an overcoat layer 39 of alumina, for example, having a thickness of 20 to 40 μm, for example, is formed over the entire surface. The surface of the overcoat layer 39 is then flattened and pads (not shown) for electrodes are formed on the overcoat layer 39. Finally, lapping of the slider is performed to form the air bearing surfaces 30 of the thin-film magnetic head including the recording head and the reproducing head. The thin-film magnetic head of the embodiment is thus completed.

Figure 12:
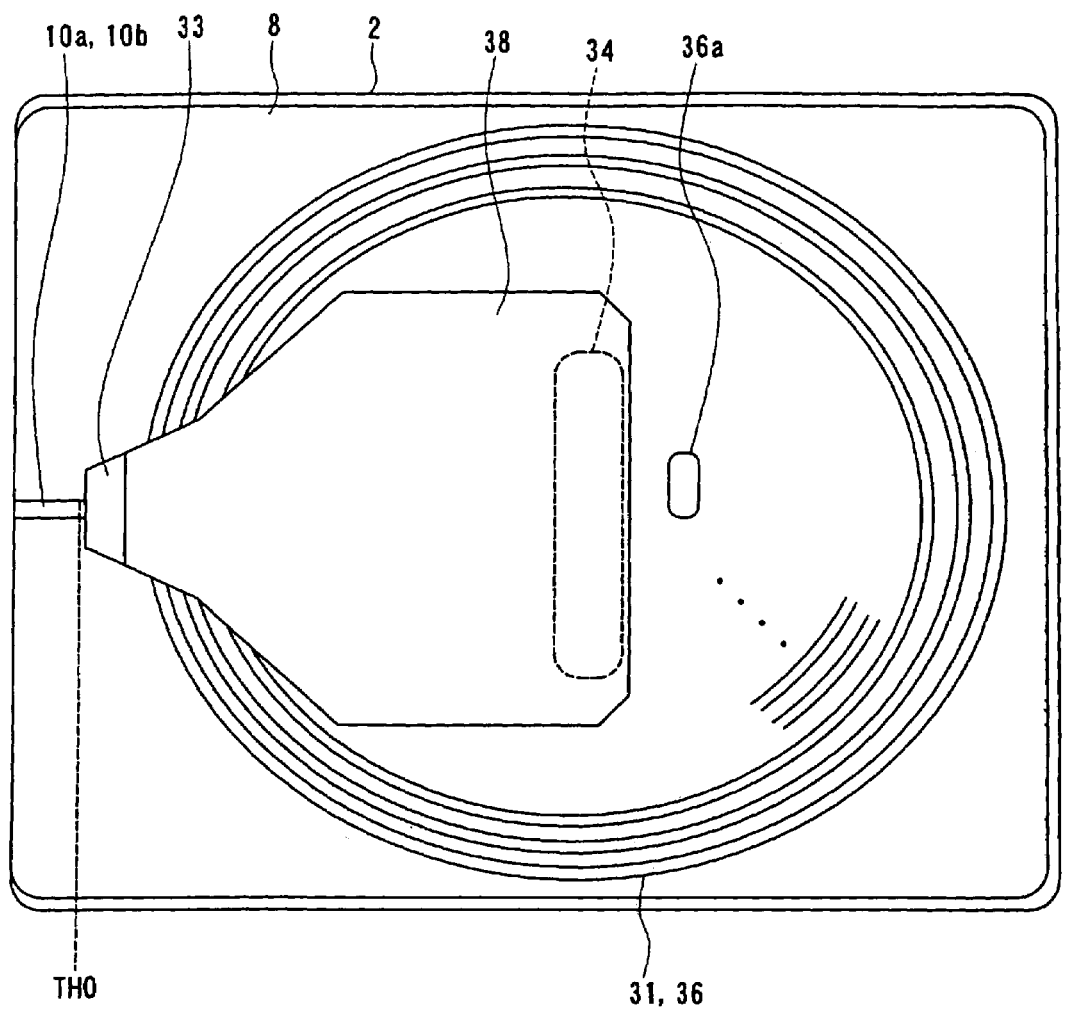
FIG. 12 is a top view of the thin-film magnetic head of the second embodiment.
Figures 15A, 15B:
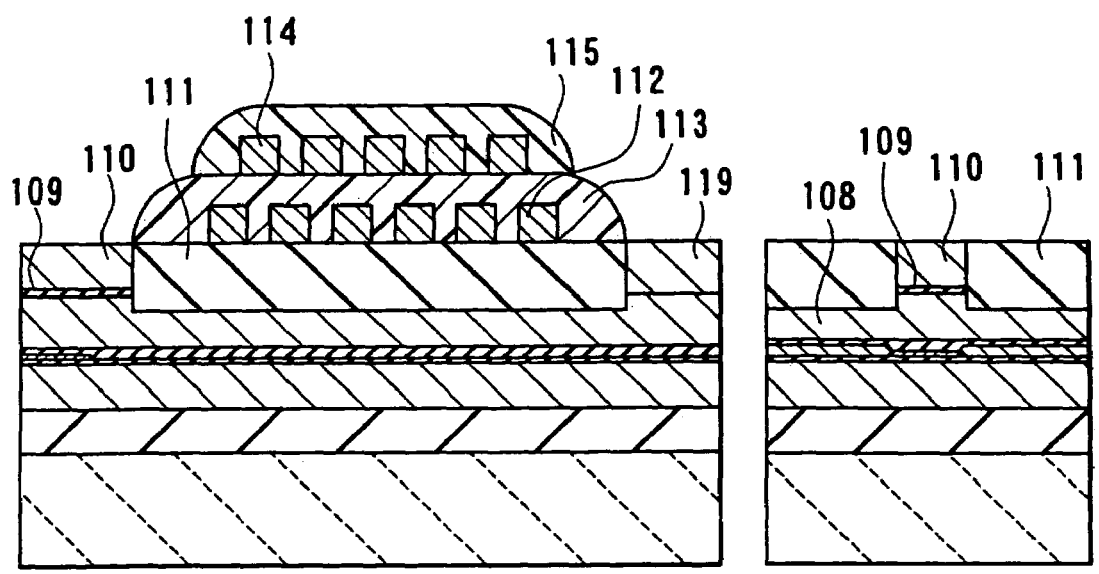
FIG. 15A and FIG. 15B are cross sections for illustrating a step that follows FIG. 14A and FIG. 14B.
Figures 16A, 16B:
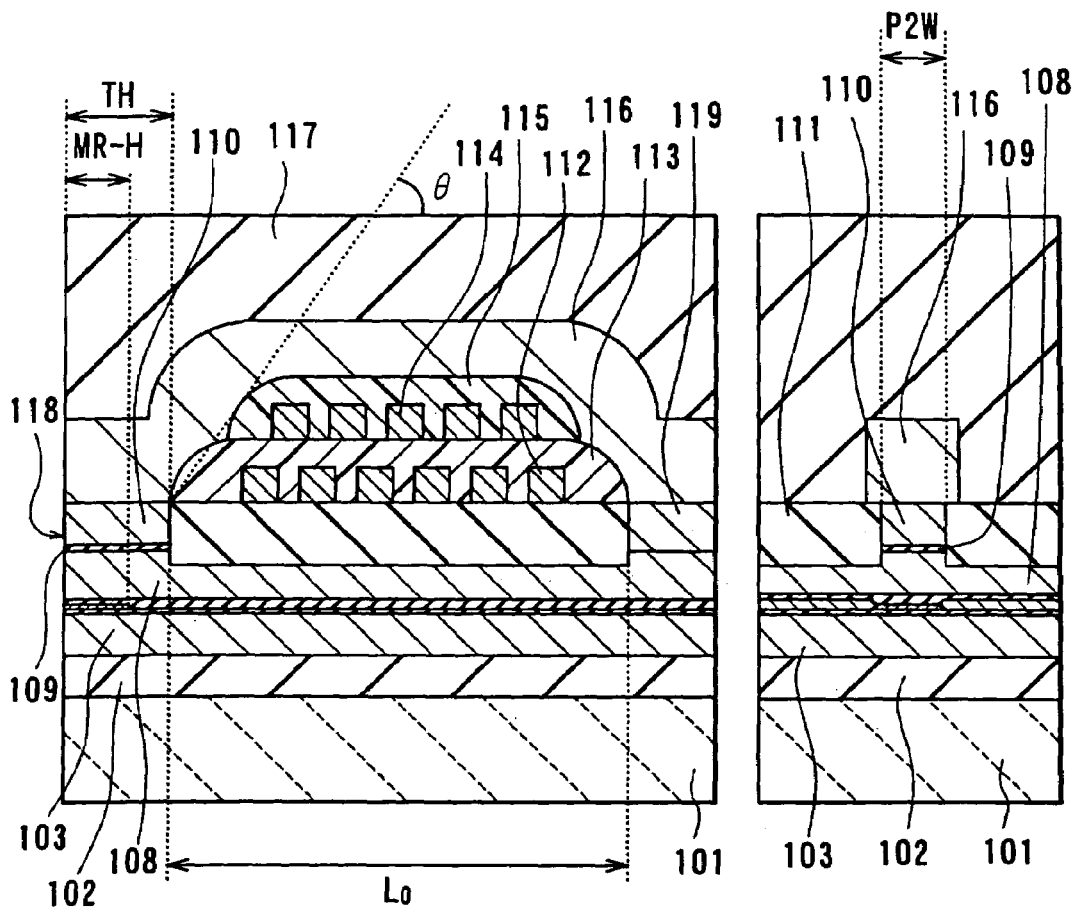
FIG. 16A and FIG. 16B are cross sections for illustrating a step that follows FIG. 15A and FIG. 15B.
Figure 17:
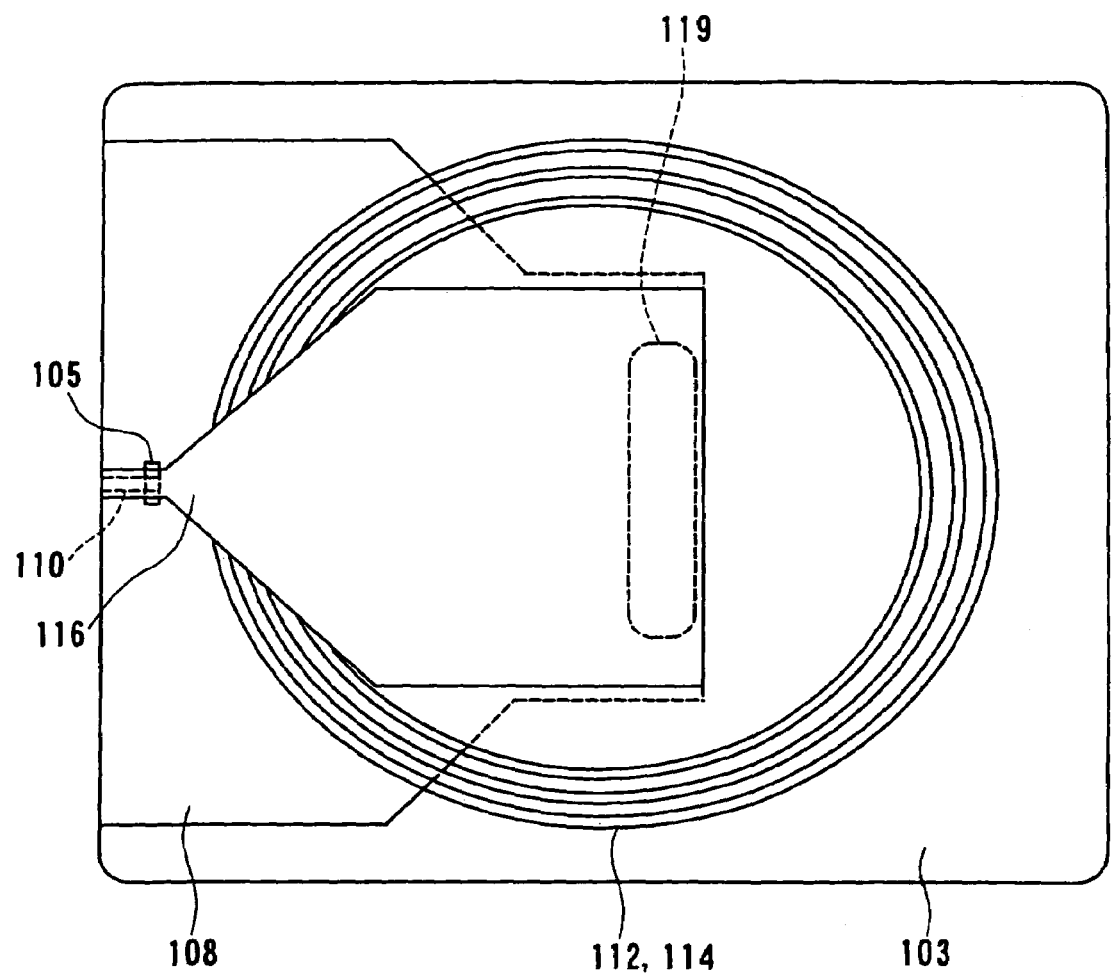
FIG. 17 is a top view of the related-art thin-film magnetic head.

FIG. 12 is a top view of the thin-film magnetic head of the embodiment, wherein the overcoat layer 39 and the other insulating layers and insulating films are omitted. In FIG. 12 'TH0' indicates the zero throat height position.

In this embodiment the second pole portion layer 10b is connected to the yoke portion layer 38 through the connecting layer 33. In the embodiment the top pole layer made up of the first pole portion layer 10a, the second pole portion layer 10b, the connecting layer 33, the magnetic layers 11, 13 and 34 and the yoke portion layer 38 corresponds to the second magnetic layer of the invention.

In this embodiment the first layer 31 of the coil corresponds to the first conductive layer of the invention. The second layer 36 of the coil corresponds to the second conductive layer of the invention.

The pole portion layers 10a and 10b, the insulating layer 12 and the magnetic layers 11 and 13 that make up the portion encasing the first layer 31 of the coil correspond to the encasing portion forming layer of the invention.

The first layer 31 and the second layer 36 of the coil, the above-mentioned layers making up the encasing portion, the raised portion 41 and the insulating layers 32 and 37 make up the thin-film coil element of the embodiment.

As a result, according to the embodiment, no manufacturing step is required for making a contact hole in a portion of the insulating layer 32 on top of the connecting portion 31a so as to connect the first layer 31 of the coil to the second layer 36. No photomask is required, either, for making the contact hole. In addition, if the raised portion 41 is formed at the same time as the first pole portion layer 10a and the magnetic layer 11 of the top pole layer, no extra step is required for making the raised portion 41, and no extra photomask is required, either. Therefore, the embodiment prevents an increase in the number of steps for manufacturing the thin-film magnetic head.

In this embodiment the first layer 31 of the thin-film coil is located on the side of the first pole portion layer 10a of the top pole layer, and formed on the flat recording gap layer 9. The second layer 36 of the thin-film coil is located on the side of the connecting layer 33, and formed on the flat insulating layer 32. It is thereby possible to form the first layer 31 and the second layer 36 of the coil of small dimensions with accuracy. A reduction in yoke length is thus achieved.

According to the embodiment, the insulating layer 37 is provided to cover the second layer 36 of the thin-film coil placed on a side of the connecting layer 33. The top surface of the insulating layer 37 is flattened. It is therefore possible to form the yoke portion layer 38 with accuracy.

The remainder of the configuration, functions and effects of the embodiment are similar to those of the first embodiment.

The present invention is not limited to the foregoing embodiments but may be practiced in still other ways. For example, it is possible that the raised portion 41 is not made of the same material as the first pole portion layer 10a of the top pole layer but made of the same material as the second pole portion layer 10b at the same time as the second pole portion layer 10b is formed.

If a two-layer thin-film coil is formed, the second layer 36 of the coil may be formed on the insulating layer 32 instead of providing the connecting layer 33 of the second embodiment. A photoresist layer may be then formed to cover the second layer 36, and the yoke portion layer of the top pole layer may be formed on this photoresist layer. Although an apex exists in this case, the height thereof is lower than that in the case where both the first layer 31 and the second layer 36 of the coil are covered with a photoresist layer. It is therefore possible to form the yoke portion layer of small dimensions with accuracy.

In the foregoing embodiments, for example, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head dedicated to writing that has an induction-type magnetic transducer only or to a thin-film magnetic head performing writing and reading through an induction-type magnetic transducer.

The thin-film coil element or the method of manufacturing the same of the invention is not limited to an induction-type magnetic transducer of a thin-film magnetic head, but may be applied to any of an inductor, a motor, a transformer, an actuator and so on each of which includes a thin-film coil.

According to the thin-film magnetic head or the method of manufacturing the same of the invention described so far, the first conductive layer is placed in the encasing portion. In addition, the auxiliary layer is provided to make the distance between the bottom of the encasing portion and the connecting portion greater than the distance between the bottom of the encasing portion and the other part of the first conductive layer. Of the first conductive layer the connecting portion is exposed from the flattened insulating layer while the other part is covered with the insulating layer. As a result, according to the invention, it is possible that no apex exists or the height of the apex is reduced. Reductions in track width and yoke length of the induction-type magnetic transducer are thereby achieved. Furthermore, according to the invention, it is not required to form a contact hole in the insulating layer for connecting the first conductive layer to the second conductive layer. In addition, it is possible to form the auxiliary layer at the same time as other layers. It is thus possible to prevent an increase in the number of steps of manufacturing the thin-film magnetic head.

According to the thin-film coil element or the method of manufacturing the same of the invention, the first conductive layer is placed in the encasing portion. In addition, the auxiliary layer is provided to make the distance between the bottom of the encasing portion and the connecting portion greater than the distance between the bottom of the encasing portion and the other part of the first conductive layer. Of the first conductive layer the connecting portion is exposed from the flattened insulating layer while the other part is covered with the insulating layer. As a result, according to the invention, it is impossible that the insulating layer extends over a wide area. It is therefore possible to reduce the thin-film coil element in size. Furthermore, according to the invention, it is not required to form a contact hole in the insulating layer for connecting the first conductive layer to the second conductive layer. In addition, it is possible to form the auxiliary layer at the same time as other layers. It is thus possible to prevent an increase in the number of steps of manufacturing the thin-film coil element.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers, the coil including a first conductive layer and a second conductive layer connected to the first conductive layer, the first conductive layer being formed on a flat surface and having a first portion connected to the second conductive layer, and a second portion that is other than the first portion, the head further comprising:

an auxiliary layer disposed between the flat surface and the first portion of the first conductive layer, for making a distance between the flat surface and the first portion greater than a distance between the flat surface and the second portion of the first conductive layer; and an insulating layer covering the second portion and having a first surface that touches the flat surface, and a second surface, opposite to the first surface, that touches the second conductive layer, wherein the second surface is flattened so that the first portion is exposed adjacent to the second surface.

2. The thin-film magnetic head according to claim 1 wherein:

one of the magnetic layers includes: a pole portion layer forming one of the pole portions and including at least one layer; and a yoke portion layer forming a yoke portion; and the auxiliary layer is made of a material the same as a material of which the at least one layer of the pole portion layer is made.

3. A thin-film coil element comprising:

a thin-film coil including a first conductive layer and a second conductive layer connected to the first conductive layer, the first conductive layer being formed on a flat surface and having a first portion connected to the second conductive layer, and a second portion that is other than the first portion;

an auxiliary layer disposed between the flat surface and the first portion of the first conductive layer, for making a distance between the flat surface and the first portion greater than a distance between the flat surface and the second portion of the first conductive layer; and an insulating layer covering the second portion and having a first surface that touches the flat surface, and a second surface, opposite to the first surface, that touches the second conductive layer, wherein the second surface is flattened so that the first portion is exposed adjacent to the second surface.

4. The thin-film coil element according to claim 3, further comprising a region defining layer provided for defining a region in which the first conductive layer is placed, the region defining layer including at least one layer, wherein the auxiliary layer is made of a material the same as a material of which the at least one layer of the region defining layer is made.

* * * * *